United States Patent
Sechrist et al.

(10) Patent No.: US 9,951,278 B2
(45) Date of Patent: Apr. 24, 2018

(54) PROCESSES FOR CONTROLLING AFTERBURN IN A REHEATER AND FOR CONTROLLING LOSS OF ENTRAINED SOLID PARTICLES IN COMBUSTION PRODUCT FLUE GAS

(71) Applicant: Ensyn Renewables, Inc., Wilmington, DE (US)

(72) Inventors: Paul A. Sechrist, South Barrington, IL (US); Andrea G. Bozzano, Northbrook, IL (US)

(73) Assignee: Ensyn Renewables, Inc., Wilmington, DE (US)

( * ) Notice: Subject to any disclaimer, the term of this patent is extended or adjusted under 35 U.S.C. 154(b) by 0 days.

(21) Appl. No.: 15/052,334

(22) Filed: Feb. 24, 2016

(65) Prior Publication Data

US 2017/0015907 A1    Jan. 19, 2017

Related U.S. Application Data

(63) Continuation of application No. 12/784,256, filed on May 20, 2010.

(51) Int. Cl.
C10B 21/12 (2006.01)
C10G 1/02 (2006.01)
(Continued)

(52) U.S. Cl.
CPC ............. C10B 21/12 (2013.01); B01D 45/16 (2013.01); B04C 3/00 (2013.01); B04C 9/00 (2013.01);
(Continued)

(58) Field of Classification Search
USPC ........................... 585/240; 201/2.5; 422/147
See application file for complete search history.

(56) References Cited

U.S. PATENT DOCUMENTS

| 1,252,072 A | 1/1918 | Abbot |
| 2,205,757 A | 6/1940 | Wheat |
| (Continued) | | |

FOREIGN PATENT DOCUMENTS

| BR | 8304158 | 7/1984 |
| BR | 8304794 | 4/1985 |
| (Continued) | | |

OTHER PUBLICATIONS

AccessScience Dictionary, "ebullating-bed reactor," http://www.accessscience.com, last visited Jul. 15, 2014.

(Continued)

Primary Examiner — Nina Bhat
(74) Attorney, Agent, or Firm — Jones Day

(57) ABSTRACT

Processes for controlling afterburn in a reheater and loss of entrained solid particles in reheater flue gas are provided. Carbonaceous biomass feedstock is pyrolyzed using a heat transfer medium forming pyrolysis products and a spent heat transfer medium comprising combustible solid particles. The spent heat transfer medium is introduced into a fluidizing dense bed. The combustible solid particles of the spent heat transfer medium are combusted forming combustion product flue gas in a dilute phase above the fluidizing dense bed. The combustion product flue gas comprises flue gas and solid particles entrained therein. The solid particles are separated from the combustion product flue gas to form separated solid particles. At least a portion of the separated solid particles are returned to the fluidizing dense bed.

20 Claims, 4 Drawing Sheets

(51) Int. Cl.

| | | |
|---|---|---|
| *B01D 45/16* | (2006.01) | |
| *B04C 3/00* | (2006.01) | |
| *B04C 9/00* | (2006.01) | |
| *C10B 45/00* | (2006.01) | |
| *C10B 47/24* | (2006.01) | |
| *C10B 53/02* | (2006.01) | |
| *C10B 57/12* | (2006.01) | |

(52) U.S. Cl.
CPC .............. *C10B 45/00* (2013.01); *C10B 47/24* (2013.01); *C10B 53/02* (2013.01); *C10B 57/12* (2013.01); *C10G 1/02* (2013.01); *C10G 2300/1014* (2013.01); *Y02E 50/14* (2013.01); *Y02P 20/145* (2015.11); *Y02P 30/20* (2015.11)

(56) References Cited

U.S. PATENT DOCUMENTS

| | | |
|---|---|---|
| 2,318,555 A | 5/1943 | Ruthruff |
| 2,326,525 A | 8/1943 | Diwoky |
| 2,328,202 A | 8/1943 | Doerner |
| 2,380,098 A | 7/1945 | Doerner |
| 2,492,948 A | 1/1950 | Berger |
| 2,566,353 A | 9/1951 | Mills |
| 2,696,979 A | 12/1954 | Berge |
| 2,884,303 A | 4/1959 | William |
| 3,130,007 A | 4/1964 | Breck |
| 3,309,356 A | 3/1967 | Esterer |
| 3,313,726 A | 4/1967 | Campbell et al. |
| 3,445,549 A | 5/1969 | Hakulin |
| 3,467,502 A | 9/1969 | Davis |
| 3,694,346 A | 9/1972 | Blaser et al. |
| 3,696,022 A | 10/1972 | Hutchings |
| 3,760,870 A | 9/1973 | Guetlhuber |
| 3,776,533 A | 12/1973 | Vlnaty |
| 3,814,176 A | 6/1974 | Seth |
| 3,853,498 A | 12/1974 | Bailie |
| 3,876,533 A | 4/1975 | Myers |
| 3,890,111 A | 6/1975 | Knudsen |
| 3,907,661 A | 9/1975 | Gwyn et al. |
| 3,925,024 A | 12/1975 | Hollingsworth et al. |
| 3,927,996 A | 12/1975 | Knudsen et al. |
| 3,959,420 A | 5/1976 | Geddes et al. |
| 4,003,829 A | 1/1977 | Burger et al. |
| 4,032,305 A | 6/1977 | Squires |
| 4,039,290 A | 8/1977 | Inada et al. |
| 4,052,265 A | 10/1977 | Kemp |
| 4,064,018 A | 12/1977 | Choi |
| 4,064,043 A | 12/1977 | Kollman |
| 4,085,030 A | 4/1978 | Green et al. |
| 4,101,414 A | 7/1978 | Kim et al. |
| 4,102,773 A | 7/1978 | Green et al. |
| 4,103,902 A | 8/1978 | Steiner et al. |
| 4,138,020 A | 2/1979 | Steiner et al. |
| 4,145,274 A | 3/1979 | Green et al. |
| 4,153,514 A | 5/1979 | Garrett et al. |
| 4,157,245 A | 6/1979 | Mitchell et al. |
| 4,165,717 A | 8/1979 | Reh et al. |
| 4,204,915 A | 5/1980 | Kurata et al. |
| 4,210,492 A | 7/1980 | Roberts |
| 4,219,537 A | 8/1980 | Steiner |
| 4,225,415 A | 9/1980 | Mirza et al. |
| 4,233,119 A | 11/1980 | Meyers et al. |
| 4,245,693 A | 1/1981 | Cheng |
| 4,272,402 A | 6/1981 | Mayes |
| 4,284,616 A | 8/1981 | Solbakken et al. |
| 4,298,453 A | 11/1981 | Schoennagel et al. |
| 4,300,009 A | 11/1981 | Haag et al. |
| 4,301,771 A | 11/1981 | Jukkola et al. |
| 4,306,619 A | 12/1981 | Trojani |
| 4,308,411 A | 12/1981 | Frankiewicz |
| 4,311,670 A | 1/1982 | Nieminen et al. |
| 4,317,703 A | 3/1982 | Bowen et al. |
| 4,321,096 A | 3/1982 | Dobbin |
| 4,324,637 A | 4/1982 | Durai-swamy |
| 4,324,641 A | 4/1982 | Durai-Swamy |
| 4,324,642 A | 4/1982 | Durai-swamy |
| 4,324,644 A | 4/1982 | Durai-swamy |
| 4,325,327 A | 4/1982 | Kantesaria et al. |
| 4,334,893 A | 6/1982 | Lang |
| 4,336,128 A | 6/1982 | Tamm |
| 4,341,598 A | 7/1982 | Green |
| 4,344,770 A | 8/1982 | Capener et al. |
| 4,364,796 A | 12/1982 | Ishii et al. |
| 4,373,994 A | 2/1983 | Lee |
| 4,415,434 A | 11/1983 | Hargreaves et al. |
| 4,422,927 A | 12/1983 | Kowalczyk |
| 4,434,726 A | 3/1984 | Jones |
| 4,443,229 A | 4/1984 | Sageman et al. |
| 4,456,504 A | 6/1984 | Spars et al. |
| 4,482,451 A | 11/1984 | Kemp |
| 4,495,056 A | 1/1985 | Venardos et al. |
| 4,504,379 A | 3/1985 | Stuntz et al. |
| 4,537,571 A | 8/1985 | Buxel et al. |
| 4,548,615 A | 10/1985 | Longchamp et al. |
| 4,552,203 A | 11/1985 | Chrysostome et al. |
| 4,574,743 A | 3/1986 | Claus |
| 4,584,064 A | 4/1986 | Ciais et al. |
| 4,584,947 A | 4/1986 | Chittick |
| 4,595,567 A | 6/1986 | Hedrick |
| 4,615,870 A | 10/1986 | Armstrong et al. |
| 4,617,693 A | 10/1986 | Meyers et al. |
| 4,645,568 A | 2/1987 | Kurps et al. |
| 4,668,243 A | 5/1987 | Schulz |
| 4,678,860 A | 7/1987 | Kuester |
| 4,684,375 A | 8/1987 | Morin et al. |
| 4,710,357 A | 12/1987 | Cetinkaya et al. |
| 4,714,109 A | 12/1987 | Tsao |
| 4,732,091 A | 3/1988 | Gould |
| 4,796,546 A | 1/1989 | Herstad et al. |
| 4,823,712 A | 4/1989 | Wormer |
| 4,828,581 A | 5/1989 | Feldmann et al. |
| 4,849,091 A | 7/1989 | Cabrera et al. |
| 4,880,473 A | 11/1989 | Scott et al. |
| 4,881,592 A | 11/1989 | Cetinkaya |
| 4,891,459 A | 1/1990 | Knight et al. |
| 4,897,178 A | 1/1990 | Best et al. |
| 4,931,171 A | 6/1990 | Piotter |
| 4,940,007 A | 7/1990 | Hiltunen et al. |
| 4,942,269 A | 7/1990 | Chum et al. |
| 4,968,325 A | 11/1990 | Black et al. |
| 4,983,278 A | 1/1991 | Cha et al. |
| 4,987,178 A | 1/1991 | Shibata et al. |
| 4,988,430 A | 1/1991 | Sechrist et al. |
| 4,992,605 A | 2/1991 | Craig et al. |
| 5,009,770 A | 4/1991 | Miller et al. |
| 5,011,592 A | 4/1991 | Owen et al. |
| 5,018,458 A | 5/1991 | McIntyre et al. |
| 5,041,209 A | 8/1991 | Cha et al. |
| 5,059,404 A | 10/1991 | Mansour et al. |
| 5,077,252 A | 12/1991 | Owen et al. |
| 5,093,085 A | 3/1992 | Engstrom et al. |
| 5,136,117 A | 8/1992 | Paisley et al. |
| 5,212,129 A | 5/1993 | Lomas |
| 5,225,044 A | 7/1993 | Breu |
| 5,236,688 A | 8/1993 | Watanabe et al. |
| 5,239,946 A | 8/1993 | Garcia-Mallol |
| 5,243,922 A | 9/1993 | Rehmat et al. |
| 5,281,727 A | 1/1994 | Carver et al. |
| 5,306,481 A | 4/1994 | Mansour et al. |
| 5,326,919 A | 7/1994 | Paisley et al. |
| 5,343,939 A | 9/1994 | Cetinkaya |
| 5,371,212 A | 12/1994 | Moens |
| 5,376,340 A | 12/1994 | Bayer et al. |
| 5,380,916 A | 1/1995 | Rao |
| 5,395,455 A | 3/1995 | Scott et al. |
| 5,402,548 A | 4/1995 | Adair et al. |
| 5,407,674 A | 4/1995 | Gabetta et al. |
| 5,423,891 A | 6/1995 | Taylor |
| 5,426,807 A | 6/1995 | Grimsley et al. |
| 5,478,736 A | 12/1995 | Nair |
| 5,494,653 A | 2/1996 | Paisley |
| 5,520,722 A | 5/1996 | Hershkowitz et al. |
| 5,536,488 A | 7/1996 | Mansour et al. |

(56) References Cited

U.S. PATENT DOCUMENTS

| | | |
|---|---|---|
| 5,578,092 A | 11/1996 | Collin |
| 5,584,985 A | 12/1996 | Lomas |
| 5,605,551 A | 2/1997 | Scott et al. |
| 5,637,192 A | 7/1997 | Mansour et al. |
| 5,654,448 A | 8/1997 | Pandey et al. |
| 5,662,050 A | 9/1997 | Angelo, II et al. |
| 5,686,049 A | 11/1997 | Bonifay et al. |
| 5,703,299 A | 12/1997 | Carleton et al. |
| 5,713,977 A | 2/1998 | Kobayashi |
| 5,725,738 A | 3/1998 | Brioni et al. |
| 5,728,271 A | 3/1998 | Piskorz et al. |
| 5,744,333 A | 4/1998 | Cociancich et al. |
| 5,788,784 A | 8/1998 | Koppenhoefer et al. |
| 5,792,340 A | 8/1998 | Freel et al. |
| 5,853,548 A | 12/1998 | Piskorz et al. |
| 5,879,079 A | 3/1999 | Hohmann et al. |
| 5,879,642 A | 3/1999 | Trimble et al. |
| 5,879,650 A | 3/1999 | Kaul et al. |
| 5,904,838 A | 5/1999 | Kalnes et al. |
| 5,915,311 A | 6/1999 | Muller et al. |
| 5,961,786 A | 10/1999 | Freel et al. |
| 5,969,165 A | 10/1999 | Liu |
| 6,002,025 A | 12/1999 | Page et al. |
| 6,011,187 A | 1/2000 | Horizoe et al. |
| 6,033,555 A | 3/2000 | Chen et al. |
| 6,106,702 A | 8/2000 | Sohn et al. |
| 6,113,862 A | 9/2000 | Jorgensen et al. |
| 6,117,199 A | 9/2000 | Ruottu |
| 6,133,499 A | 10/2000 | Horizoe et al. |
| 6,149,765 A | 11/2000 | Mansour et al. |
| 6,190,542 B1 | 2/2001 | Comolli et al. |
| 6,193,837 B1 | 2/2001 | Agblevor et al. |
| 6,237,541 B1 | 5/2001 | Alliston et al. |
| 6,339,182 B1 | 1/2002 | Munson et al. |
| 6,497,199 B2 | 1/2002 | Yamada et al. |
| 6,398,921 B1 | 6/2002 | Moraski |
| 6,452,024 B1 | 9/2002 | Bui-Khac et al. |
| 6,455,015 B1 | 9/2002 | Kilroy |
| 6,485,841 B1 | 11/2002 | Freel et al. |
| 6,547,957 B1 | 4/2003 | Sudhakar et al. |
| 6,555,649 B2 | 4/2003 | Giroux et al. |
| 6,656,342 B2 | 12/2003 | Smith et al. |
| 6,660,157 B2 | 12/2003 | Que et al. |
| 6,676,828 B1 | 1/2004 | Galiasso et al. |
| 6,680,137 B2 | 1/2004 | Paisley et al. |
| 6,743,746 B1 | 6/2004 | Prilutsky et al. |
| 6,759,562 B2 | 7/2004 | Gartside et al. |
| 6,768,036 B2 | 7/2004 | Lattner et al. |
| 6,776,607 B2 | 8/2004 | Nahas et al. |
| 6,808,390 B1 | 10/2004 | Fung |
| 6,814,940 B1 | 11/2004 | Hiltunen et al. |
| 6,844,420 B1 | 1/2005 | Freel et al. |
| 6,875,341 B1 | 4/2005 | Bunger et al. |
| 6,960,325 B2 | 11/2005 | Kao et al. |
| 6,962,676 B1 | 11/2005 | Hyppaenen |
| 6,988,453 B2 | 1/2006 | Cole et al. |
| 7,004,999 B2 | 2/2006 | Johnson et al. |
| 7,022,741 B2 | 4/2006 | Jiang et al. |
| 7,026,262 B1 | 4/2006 | Palmas et al. |
| 7,202,389 B1 | 4/2007 | Brem |
| 7,214,252 B1 | 5/2007 | Krumm et al. |
| 7,226,954 B2 | 6/2007 | Tavasoli et al. |
| 7,240,639 B2 | 7/2007 | Hyppaenen et al. |
| 7,247,233 B1 | 7/2007 | Hedrick et al. |
| 7,262,331 B2 | 8/2007 | van de Beld et al. |
| 7,263,934 B2 | 9/2007 | Copeland et al. |
| 7,285,186 B2 | 10/2007 | Tokarz |
| 7,319,168 B2 | 1/2008 | Sanada |
| 7,473,349 B2 | 1/2009 | Keckler et al. |
| 7,476,774 B2 | 1/2009 | Umansky et al. |
| 7,479,217 B2 | 1/2009 | Pinault et al. |
| 7,491,317 B2 | 2/2009 | Meier et al. |
| 7,563,345 B2 | 7/2009 | Tokarz |
| 7,572,362 B2 | 8/2009 | Freel et al. |
| 7,572,365 B2 | 8/2009 | Freel et al. |
| 7,578,927 B2 | 8/2009 | Marker et al. |
| 7,625,432 B2 | 12/2009 | Gouman et al. |
| 7,811,340 B2 | 10/2010 | Bayle et al. |
| 7,897,124 B2 | 3/2011 | Gunnerman et al. |
| 7,905,990 B2 | 3/2011 | Freel |
| 7,943,014 B2 | 5/2011 | Berruti et al. |
| 7,956,224 B2 | 6/2011 | Elliott et al. |
| 7,960,598 B2 | 6/2011 | Spilker et al. |
| 7,982,075 B2 | 7/2011 | Marker et al. |
| 7,998,315 B2 | 8/2011 | Bridgwater et al. |
| 7,998,455 B2 | 8/2011 | Abbas et al. |
| 7,999,142 B2 | 8/2011 | Kalnes et al. |
| 7,999,143 B2 | 8/2011 | Marker et al. |
| 8,043,391 B2 | 10/2011 | Dinjus et al. |
| 8,057,641 B2 | 11/2011 | Bartek et al. |
| 8,097,090 B2 | 1/2012 | Freel et al. |
| 8,097,216 B2 | 1/2012 | Beech et al. |
| 8,147,766 B2 | 4/2012 | Spilker et al. |
| 8,153,850 B2 | 4/2012 | Hall et al. |
| 8,202,332 B2 | 6/2012 | Agblevor |
| 8,207,385 B2 | 6/2012 | O'Connor et al. |
| 8,217,211 B2 | 7/2012 | Agrawal et al. |
| 8,277,643 B2 | 10/2012 | Huber et al. |
| 8,288,600 B2 | 10/2012 | Bartek et al. |
| 8,304,592 B2 | 11/2012 | Luebke |
| 8,314,275 B2 | 11/2012 | Brandvold |
| 8,329,967 B2 | 12/2012 | Brandvold et al. |
| 8,404,910 B2 | 3/2013 | Kocal et al. |
| 8,499,702 B2 | 8/2013 | Palmas et al. |
| 8,519,203 B2 | 8/2013 | Marinangeli et al. |
| 8,519,205 B2 | 8/2013 | Frey et al. |
| 8,524,087 B2 | 9/2013 | Frey et al. |
| 8,575,408 B2 | 11/2013 | Marker et al. |
| 8,715,490 B2 | 5/2014 | Brandvold et al. |
| 8,726,443 B2 | 5/2014 | Freel et al. |
| 9,044,727 B2 | 6/2015 | Kulprathipanja et al. |
| 2002/0014033 A1 | 2/2002 | Langer et al. |
| 2002/0100711 A1 | 8/2002 | Freel et al. |
| 2002/0146358 A1 | 10/2002 | Smith et al. |
| 2003/0049854 A1 | 3/2003 | Rhodes |
| 2003/0202912 A1 | 10/2003 | Myohanen et al. |
| 2004/0069682 A1 | 4/2004 | Freel et al. |
| 2004/0182003 A1 | 9/2004 | Bayle et al. |
| 2004/0200204 A1 | 10/2004 | Dries et al. |
| 2005/0167337 A1 | 8/2005 | Bunger et al. |
| 2005/0209328 A1 | 9/2005 | Allgod et al. |
| 2006/0010714 A1 | 1/2006 | Carin et al. |
| 2006/0016723 A1 | 1/2006 | Tang et al. |
| 2006/0070362 A1 | 4/2006 | Dewitz et al. |
| 2006/0074254 A1 | 4/2006 | Zhang et al. |
| 2006/0101665 A1 | 5/2006 | Carin et al. |
| 2006/0163053 A1 | 7/2006 | Ershag |
| 2006/0180060 A1 | 8/2006 | Crafton et al. |
| 2006/0185245 A1 | 8/2006 | Serio et al. |
| 2006/0201024 A1 | 9/2006 | Carin et al. |
| 2006/0254081 A1 | 11/2006 | Carin et al. |
| 2006/0264684 A1 | 11/2006 | Petri et al. |
| 2007/0000809 A1 | 1/2007 | Lin et al. |
| 2007/0010588 A1 | 1/2007 | Pearson |
| 2007/0141222 A1 | 6/2007 | Binder et al. |
| 2007/0205139 A1 | 9/2007 | Kulprathipanja et al. |
| 2007/0272538 A1 | 11/2007 | Satchell |
| 2008/0006519 A1 | 1/2008 | Badger |
| 2008/0006520 A1 | 1/2008 | Badger |
| 2008/0029437 A1 | 2/2008 | Umansky et al. |
| 2008/0035526 A1 | 2/2008 | Hedrick et al. |
| 2008/0035528 A1 | 2/2008 | Marker |
| 2008/0050792 A1 | 2/2008 | Zmierczak et al. |
| 2008/0051619 A1 | 2/2008 | Kulprathipanja et al. |
| 2008/0081006 A1 | 4/2008 | Myers et al. |
| 2008/0086937 A1 | 4/2008 | Hazlebeck et al. |
| 2008/0161615 A1 | 7/2008 | Chapus et al. |
| 2008/0171649 A1 | 7/2008 | Jan et al. |
| 2008/0185112 A1 | 8/2008 | Argyropoulos |
| 2008/0189979 A1 | 8/2008 | Carin et al. |
| 2008/0193345 A1 | 8/2008 | Lott et al. |
| 2008/0194896 A1 | 8/2008 | Brown et al. |
| 2008/0199821 A1 | 8/2008 | Nyberg et al. |
| 2008/0230440 A1 | 9/2008 | Graham et al. |

(56) References Cited

U.S. PATENT DOCUMENTS

| | | | |
|---|---|---|---|
| 2008/0236043 A1 | 10/2008 | Dinjus et al. |
| 2008/0264771 A1 | 10/2008 | Dam-Johansen et al. |
| 2008/0274017 A1 | 11/2008 | Boykin et al. |
| 2008/0274022 A1 | 11/2008 | Boykin et al. |
| 2008/0282606 A1 | 11/2008 | Plaza et al. |
| 2008/0312476 A1 | 12/2008 | McCall |
| 2008/0318763 A1 | 12/2008 | Anderson |
| 2009/0008292 A1 | 1/2009 | Keusenkothen et al. |
| 2009/0008296 A1 | 1/2009 | Sappok et al. |
| 2009/0077867 A1 | 3/2009 | Marker et al. |
| 2009/0077868 A1 | 3/2009 | Brady et al. |
| 2009/0078557 A1 | 3/2009 | Tokarz |
| 2009/0078611 A1 | 3/2009 | Marker et al. |
| 2009/0082603 A1 | 3/2009 | Kalnes et al. |
| 2009/0082604 A1 | 3/2009 | Agrawal et al. |
| 2009/0084666 A1 | 4/2009 | Agrawal et al. |
| 2009/0090046 A1 | 4/2009 | O'Connor et al. |
| 2009/0090058 A1 | 4/2009 | Dam-Johansen et al. |
| 2009/0113787 A1 | 5/2009 | Elliott et al. |
| 2009/0139851 A1 | 6/2009 | Freel |
| 2009/0165378 A1 | 7/2009 | Agblevor |
| 2009/0183424 A1 | 7/2009 | Gorbell et al. |
| 2009/0188158 A1 | 7/2009 | Morgan |
| 2009/0193709 A1 | 8/2009 | Marker et al. |
| 2009/0208402 A1 | 8/2009 | Rossi |
| 2009/0227823 A1 | 9/2009 | Huber et al. |
| 2009/0242377 A1 | 10/2009 | Honkola et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0255144 A1 | 10/2009 | Gorbell et al. |
| 2009/0259076 A1 | 10/2009 | Simmons et al. |
| 2009/0259082 A1 | 10/2009 | Deluga et al. |
| 2009/0274600 A1 | 11/2009 | Jain et al. |
| 2009/0283442 A1 | 11/2009 | McCall et al. |
| 2009/0287029 A1 | 11/2009 | Anumakonda et al. |
| 2009/0293344 A1 | 12/2009 | O'Brien et al. |
| 2009/0293359 A1 | 12/2009 | Simmons et al. |
| 2009/0294324 A1 | 12/2009 | Brandvold et al. |
| 2009/0301930 A1 | 12/2009 | Brandvold et al. |
| 2009/0308787 A1 | 12/2009 | O'Connor et al. |
| 2009/0318737 A1 | 12/2009 | Luebke |
| 2009/0321311 A1 | 12/2009 | Marker et al. |
| 2010/0043634 A1 | 2/2010 | Shulfer et al. |
| 2010/0083566 A1 | 4/2010 | Fredriksen et al. |
| 2010/0133144 A1 | 6/2010 | Kokayeff et al. |
| 2010/0147743 A1 | 6/2010 | MacArthur et al. |
| 2010/0151550 A1 | 6/2010 | Nunez et al. |
| 2010/0158767 A1 | 6/2010 | Mehlberg et al. |
| 2010/0148122 A1 | 7/2010 | Breton et al. |
| 2010/0162625 A1 | 7/2010 | Mills |
| 2010/0163395 A1 | 7/2010 | Henrich et al. |
| 2010/0222620 A1 | 9/2010 | O'Connor et al. |
| 2010/0266464 A1 | 10/2010 | Sipila et al. |
| 2010/0325954 A1 | 12/2010 | Tiwari et al. |
| 2011/0017443 A1 | 1/2011 | Collins |
| 2011/0067438 A1 | 3/2011 | Bernasconi |
| 2011/0068585 A1 | 3/2011 | Dube et al. |
| 2011/0113675 A1 | 5/2011 | Fujiyama et al. |
| 2011/0123407 A1 | 5/2011 | Freel |
| 2011/0132737 A1 | 6/2011 | Jadhav |
| 2011/0139597 A1 | 6/2011 | Lin |
| 2011/0146135 A1 | 6/2011 | Brandvold |
| 2011/0146140 A1 | 6/2011 | Brandvold et al. |
| 2011/0146141 A1 | 6/2011 | Frey et al. |
| 2011/0146145 A1 | 6/2011 | Brandvold et al. |
| 2011/0160505 A1 | 6/2011 | McCall |
| 2011/0182778 A1 | 7/2011 | Breton et al. |
| 2011/0201854 A1 | 8/2011 | Kocal et al. |
| 2011/0224471 A1 | 9/2011 | Wormsbecher et al. |
| 2011/0239530 A1 | 10/2011 | Marinangeli et al. |
| 2011/0253600 A1 | 10/2011 | Niccum |
| 2011/0258914 A1 | 10/2011 | Banasiak et al. |
| 2011/0284359 A1 | 11/2011 | Sechrist et al. |
| 2012/0012039 A1 | 1/2012 | Palmas et al. |
| 2012/0017493 A1 | 1/2012 | Traynor et al. |
| 2012/0022171 A1 | 1/2012 | Frey |
| 2012/0023809 A1 | 2/2012 | Koch et al. |
| 2012/0047794 A1 | 3/2012 | Bartek et al. |
| 2012/0137939 A1 | 6/2012 | Kulprathipanja |
| 2012/0160741 A1 | 6/2012 | Gong et al. |
| 2012/0167454 A1 | 7/2012 | Brandvold et al. |
| 2012/0172622 A1 | 7/2012 | Kocal |
| 2012/0205289 A1 | 8/2012 | Joshi |
| 2012/0214114 A1 | 8/2012 | Kim et al. |
| 2012/0216448 A1 | 8/2012 | Ramirez Coredores et al. |
| 2012/0279825 A1 | 11/2012 | Freel et al. |
| 2012/0317871 A1 | 12/2012 | Frey et al. |
| 2013/0029168 A1 | 1/2013 | Trewella et al. |
| 2013/0062184 A1 | 3/2013 | Kulprathipanja et al. |
| 2013/0067803 A1 | 3/2013 | Kalakkunnath et al. |
| 2013/0075072 A1 | 3/2013 | Kulprathipanja et al. |
| 2013/0078581 A1 | 3/2013 | Kulprathipanja et al. |
| 2013/0212930 A1 | 3/2013 | Naae et al. |
| 2013/0105356 A1 | 5/2013 | Dijs et al. |
| 2013/0109765 A1 | 5/2013 | Jiang et al. |
| 2013/0118059 A1 | 5/2013 | Lange et al. |
| 2013/0150637 A1 | 6/2013 | Borremans et al. |
| 2013/0152453 A1 | 6/2013 | Baird et al. |
| 2013/0152454 A1 | 6/2013 | Baird et al. |
| 2013/0152455 A1 | 6/2013 | Baird et al. |
| 2013/0195727 A1 | 8/2013 | Bull et al. |
| 2013/0267743 A1 | 10/2013 | Brandvold et al. |
| 2014/0001026 A1 | 1/2014 | Baird et al. |
| 2014/0140895 A1 | 5/2014 | Davydov et al. |
| 2014/0142362 A1 | 5/2014 | Davydov et al. |

FOREIGN PATENT DOCUMENTS

| | | |
|---|---|---|
| CA | 1312497 | 1/1993 |
| CA | 2091373 | 9/1997 |
| CA | 2299149 | 12/2000 |
| CA | 2521829 | 3/2006 |
| CN | 1377938 | 11/2002 |
| CN | 1730177 | 2/2006 |
| CN | 101045524 | 10/2007 |
| CN | 101238197 | 8/2008 |
| CN | 101294085 | 10/2008 |
| CN | 101318622 | 12/2008 |
| CN | 101353582 | 1/2009 |
| CN | 101365770 | 2/2009 |
| CN | 101381611 | 3/2009 |
| CN | 101544901 | 9/2009 |
| CN | 101550347 | 10/2009 |
| CN | 101745349 | 6/2010 |
| CN | 101993712 | 3/2011 |
| EP | 105980 | 1/1986 |
| EP | 578503 | 1/1994 |
| EP | 676023 | 7/1998 |
| EP | 718392 | 9/1999 |
| EP | 787946 | 6/2000 |
| EP | 1420058 | 5/2004 |
| EP | 2325281 | 5/2011 |
| FI | 117512 | 11/2005 |
| FR | 879606 | 3/1943 |
| GB | 1019133 | 2/1966 |
| GB | 1300966 | 12/1972 |
| JP | 58150793 | 9/1983 |
| JP | 1277196 | 11/1989 |
| JP | 11148625 | 6/1999 |
| JP | 2001/131560 | 5/2001 |
| JP | 2007/229548 | 9/2007 |
| JP | 2008/138188 | 6/2008 |
| SE | 9903742-6 | 1/2004 |
| WO | 81/01713 | 6/1981 |
| WO | 1991/11499 | 8/1991 |
| WO | 1992/07842 | 5/1992 |
| WO | 1992/18492 | 10/1992 |
| WO | WO 1993/011388 | 6/1993 |
| WO | 1994/13827 | 6/1994 |
| WO | 1997/044410 | 11/1997 |
| WO | 2001/009243 | 2/2001 |
| WO | 2001/83645 | 11/2001 |
| WO | 2002/49735 | 6/2002 |

(56) References Cited

FOREIGN PATENT DOCUMENTS

| | | |
|---|---|---|
| WO | 2006/071109 | 7/2006 |
| WO | 2007/017005 | 2/2007 |
| WO | 2007/045093 | 4/2007 |
| WO | 2007/050030 | 5/2007 |
| WO | 2007/112570 | 10/2007 |
| WO | 2007/128798 | 11/2007 |
| WO | 2008/009643 | 1/2008 |
| WO | 2008/020167 | 2/2008 |
| WO | 2008/092557 | 8/2008 |
| WO | 2009/019520 | 2/2009 |
| WO | 2009/047387 | 4/2009 |
| WO | 2009/047392 | 4/2009 |
| WO | 2009/067350 | 5/2009 |
| WO | 2009/099684 | 8/2009 |
| WO | 2009/118357 | 10/2009 |
| WO | 2009/118363 | 10/2009 |
| WO | 2009/126508 | 10/2009 |
| WO | 2009/131757 | 10/2009 |
| WO | 2010/002792 | 1/2010 |
| WO | 2011/146262 | 11/2011 |
| WO | 2012/009207 | 1/2012 |
| WO | 2012/012260 | 1/2012 |
| WO | 2012/062924 | 5/2012 |
| WO | 2012/078422 | 6/2012 |
| WO | 2012/088546 | 6/2012 |
| WO | 2012/115754 | 8/2012 |
| WO | 2013/043485 | 3/2013 |
| WO | 2013/090229 | 6/2013 |
| WO | 2014/031965 | 2/2014 |
| WO | 2014/210150 | 12/2014 |

OTHER PUBLICATIONS

Adam, J. "Catalytic conversion of biomass to produce higher quality liquid bio-fuels," *PhD Thesis*, Department of Energy and Process Engineering, The Norwegian University of Science and Technology, Trondheim (2005).

Adam, J. et al. "Pyrolysis of biomass in the presence of Al-MCM-41 type catalysts," *Fuel*, 84 (2005) 1494-1502.

Adjaye, John D. et al. "Catalytic conversion of a biomass-derived oil to fuels and chemicals I: Model compound studies and reaction pathways," *Biomass & Bioenergy*, 8:3 (1995) 131-149.

Adjaye, John D. et al. "Catalytic conversion of a biomass-derived oil to fuels and chemicals II: Chemical kinetics, parameter estimation and model predictions," *Biomass & Bioenergy*, 8:4 (1995) 265-277.

Adjaye, John D. et al. "Catalytic conversion of wood derived bio-oil to fuels and chemicals," *Studies in Surface Science and Catalysis*, 73 (1992) 301-308.

Adjaye, John D. et al. "Production of hydrocarbons by the catalytic upgrading of a fast pyrolysis bio-oil," *Fuel Process Technol*, 45:3 (1995) 161-183.

Adjaye, John D. et al. "Upgrading of a wood-derived oil over various catalysts," *Biomass & Bioenergy*, 7:1-6 (1994) 201-211.

Aho, A. et al. "Catalytic pyrolysis of woody biomass in a fluidized bed reactor; Influence of zeolites structure, Science Direct," *Fuel*, 87 (2008) 2493-2501.

Antonakou, E. et al. "Evaluation of various types of Al-MCM-41 materials as catalysts in biomass pyrolysis for the production of bio-fuels and chemicals," *Fuel*, 85 (2006) 2202-2212.

Atutxa, A. et al. "Kinetic Description of the Catalytic Pyrolysis of Biomass in a Conical Spouted Bed Reactor," *Energy Fuels*, 19:3 (2005) 765-774.

Baker, E. G. et al. "Catalytic Upgrading of Biomass Pyrolysis Oils," in Bridgwater, A. V. et al. (eds) *Research in Thermochemical Biomass Conversion*, Elsevier Science Publishers Ltd., Barking, England (1988) 883-895.

Baldauf, W. et al. "Upgrading of flash pyrolysis oil and utilization in refineries," *Biomass & Bioenergy*, 7 (1994) 237-244.

Baumlin, "The continuous self stirred tank reactor: measurement of the cracking kinetics of biomass pyrolysis vapours," *Chemical Engineering Science*, 60 (2005) 41-55.

Berg, "Reactor Development for the Ultrapyrolysis Process," *The Canadian Journal of Chemical Engineering*, 67 (1989) 96-101.

Bielansky, P. et al. "Catalytic conversion of vegetable oils in a continuous FCC pilot plant," *Fuel Processing Technology*, 92 (2011) 2305-2311.

Bimbela, F. et al. "Hydrogen production by catalytic steam reforming of acetic acid, a model compound of biomass pyrolysis liquids," *J. Ana App. Pyrolysis*, 79 (2007) 112-120.

Bridgwater et al. (eds) *Fast Pyrolysis of Biomass: A Handbook*, Newbury Cpl Press, Great Britain (2008) 1-13.

Bridgwater, A.V. "Principles and practices of biomass fast pyrolysis processes for liquids," *Journal of Analytical and Applied Pyrolysis*, 51 (1999) 3-22.

Bridgwater, Tony "Production of high grade fuels and chemicals from catalytic pyrolysis of biomass," *Catalysis Today*, 29 (1996) 285-295.

Bridgwater, Tony et al. "Transport fuels from biomass by thermal processing," *EU-China Workshop on Liquid Biofuels*, Beijing, China (Nov. 4-5, 2004).

Buchsbaum, A. et al. "The Challenge of the Biofuels Directive for a European Refinery," *OMW Refining and Marketing, ERTC 9th Annual Meeting*, Prague, Czech Republic (Nov. 15-17, 2004).

Carlson, T. et al. "Aromatic Production from Catalytic Fast Pyrolysis of Biomass-Derived Feedstocks," *Top Catal*, 52 (2009) 241-242.

Carlson., T. et al. "Green Gasoline by Catalytic Fast Pyrolysis of Solid Biomass Derived Compounds," *ChemSusChem*, 1 (2008) 397-400.

Cass et al. "Challenges in the Isolation of Taxanes from *Taxus canadensis* by Fast Pyrolysis," *J Analytical and Applied Pyrolysis* 57 (2001) 275-285.

Chantal, P. D. et al. "Production of Hydrocarbons from Aspen Poplar Pyrolytic Oils over H-ZSM5," *Applied Catalysis*, 10 (1984) 317-332.

Chen, N. Y. et al. "Fluidized Upgrading of Wood Pyrolysis Liquids and Related Compounds," in Soltes, E. J. et al. (eds) *Pyrolysis Oils from Biomass*, ACS, Washington, DC (1988) 277-289.

Chinsuwan, A. et al. "An experimental investigation of the effect of longitudinal fin orientation on heat transfer in membrane water wall tubes in a circulating ftuidized bed," *International Journal of Heat and Mass Transfer*, 52:5-6 (2009) 1552-1560.

Cornelissen, T. et al., "Flash co-pyrolysis of biomass with polylactic acid. Part 1: Influence on bio-oil yield and heating value," *Fuel* 87 (2008) 1031-1041.

Cousins, A. et al. "Development of a bench-scale high-pressure fluidized bed reactor and its sequential modification for studying diverse aspects of pyrolysis and gasification of coal and biomass," *Energy and Fuels*, 22:4 (2008) 2491-2503.

Cragg et al. "The Search for New Pharmaceutical Crops: Drug Discovery and Development at the National Cancer Institute," in Janick, J. and Simon, J.E. (eds) *New Crops*, Wiley, New York (1993) 161-167.

Czernik, S. et al. "Hydrogen from biomass-production by steam reforming of biomass pyrolysis oil," *Catalysis Today*, 129 (2007) 265-168.

Czernik, S. et al. "Hydrogren by Catalytic Steam Reforming of Liquid Byproducts from Biomass Thermoconversion Processes," *Ind. Eng. Chern. Res.*, 41 (2002) 4209-4215.

Dahmen, "Rapid pyrolysis for the pretreatment of biomass and generation of bioslurry as intermediate fuel", *Chemie-Ingenieur-Technik*, 79:9 (2007) 1326-1327. Language: German (Abstract only; Machine translation of Abstract).

Dandik, "Catalytic Conversion of Used Oil to Hydrocarbon Fuels in a Fractionating Pyrolysis Reactor," *Energy & Fuels*, 12 (1998) 1148-1152.

Daoust et al. "Canada Yew (*Taxus canadensis* Marsh.) and Taxanes: a Perfect Species for Field Production and Improvement through Genetic Selection," Natural Resources Canada, Canadian Forest Service, Sainte-Fov, Quebec (2003).

(56) References Cited

OTHER PUBLICATIONS de Wild, P. et al. "Lignin valorisation for chemicals and (transportation) fuels via (catalytic) pyrolysis and hydrodeoxygenation," *Environ. Prog. Sustainable Energy*, 28 (2009) 461-469.
Demirbas, Ayhan "Fuel Conversional Aspects of Palm Oil and Sunflower Oil," *Energy Sources*, 25 (2003) 457-466.
Di Blasi, C. et al. "Effects of Potassium Hydroxide Impregnation of Wood Pyrolysis, American Chemical Society," *Energy & Fuels* 23 (2009) 1045-1054.
Ellioti, D. "Historical Developments in Hydroprocessing Bio-oils," *Energy & Fuels*, 21 (2007) 1792-1815.
Ensyn Technologies Inc. "Catalytic de-oxygenation of biomass-derived RTP vapors." Prepared for ARUSIA, Agenzia Regionale Umbria per lo Sviluppo e L'Innovazione, Perugia, Italy (Mar. 1997).
Filtration, Kirk-Othmer Encyclopedia of Chemical Technology 5th Edition. vol. 11., John Wiley & Sons, Inc., Feb. 2005.
Gayubo, A. G. et al. "Deactivation of a HZSM-5 Zeolite Catalyst in the Transformation of the Aqueous Fraction of Biomass Pyrolysis Oil into Hydrocarbons," *Energy & Fuels*, 18:6 (2004) 1640-1647.
Gayubo, A. G. et al. "Undesired components in the transformation of biomass pyrolysis oil into hydrocarbons on an HZSM-5 zeolite catalyst," *J Chem Tech Biotech*, 80 (2005) 1244-1251.
Gevert, Börjie S. et al. "Upgrading of directly liquefied biomass to transportation fuels: catalytic cracking," *Biomass* 14:3 (1987) 173-183.
Goesele, W. et al., Filtration, Wiley-VCHVerlag GmbH & Co. KGaA, Weinheim, 10.1002/14356007.b0210, 2005.
Grange, P. et al. "Hydrotreatment of pyrolysis oils from biomass: reactivity of the various categories of oxygenated compounds and preliminary techno-economical study," *Catalysis Today*, 29 (1996) 297-301.
Hama, "Biodiesel-fuel production in a packed-bed reactor using lipase-producing Rhizopus oryzae cells immobilized within biomass support particles", *Biochemical Engineering Journal*, 34 (2007) 273-278.
Hoekstra, E. et al., "Fast Pyrolysis of Biomass in a Fluidized Bed Reactor: In Situ Filtering of the Vapors," *Ind. Eng. Chern. Res.*, 48:10 (2009) 4744-4756.
Holton et al. "First Total Synthesis of Taxol. 2. Completion of the C and D Rings," *J Am Chem Soc*, 116 (1994) 1599-1600.
Horne, Patrick A. et al. "Catalytic coprocessing of biomass-derived pyrolysis vapours and methanol," *J. Analytical and Applied Pyrolysis*, 34:1 (1995) 87-108.
Horne, Patrick A. et al. "Premium quality fuels and chemicals from the fluidised bed pyrolysis of biomass with zeolite catalyst upgrading," *Renewable Energy*, 5:5-8 (1994) 810-812.
Horne, Patrick A. et al. "The effect of zeolite ZSM-5 catalyst deactivation during the upgrading of biomass-derived pyrolysis vapours," *J Analytical and Applied Pyrolysis*, 34:1 (1995) 65-85.
Huang et al. "New Taxanes from *Taxus brevifolia*," *J of Natural Products*, 49 (1986) 665-669.
Huffman, D. R. et al., Ensyn Technologies Inc., "Thermo-Catalytic Cracking of Wood to Transportation Fuels," DSS Contract No. 38SQ.23440-4-1429, Efficiency and Alternative Energy Technology Branch, Natural Resources Canada, Ottawa, Canada (1997).
Huffman, D. R., Ensyn Technologies Inc., "Thermo-catalytic cracking of wood to transportation fuels using the RTP process," DSS Contract No. 38SQ.23440-4-1429, Efficiency and Alternative Energy Technology Branch, Natural Resources Canada, Ottawa, Ontario (Jan. 1997).
Hughes, J. et al. "Structural variations in natural F, OH and CI apatites," *American Mineralogist*, 74 (1989) 870-876.
Huie, C. W. "A review of modern sample-preparation techniques for the extraction and analysis of medicinal plants," *Anal Bioanal Chem*, 373 (2002) 23-30.
International Search Report dated Feb. 22, 2013 for corresponding International Application No. PCT/US2012/68876.
Ioannidou, "Investigating the potential for energy, fuel, materials and chemicals production from corn residues (cobs and stalks) by non-catalytic and catalytic pyrolysis in two reactor configurations," *Renewable and Sustainable Energy Reviews*, 13 (2009) 750-762.
Iojoiu, E. et al. "Hydrogen production by sequential cracking of biomass-derived pyrolysis oil over noble metal catalysts supported on ceria-zirconia," *Applied Catalysis A: General*, 323 (2007) 147-161.
Jackson, M. et al. "Screening heterogenous catalysts for the pyrolysis of lignin," *J. Anal. Appl. Pyrolysis*, 85 (2009) 226-230.
Junming et al. "Bio-oil upgrading by means of ethyl ester production in reactive distillation to remove water and to improve storage and fuel characteristics," *Biomass and Energy*, 32 (2008) 1056-1061.
Kalnes, Tom et al. "Feedstock Diversity in the Refining Industry," UOP Report to NREL and DOE (2004).
Khanal, "Biohydrogen Production in Continuous-Flow Reactor Using Mixed Microbial Culture," *Water Environment Research*, 78:2 (2006) 110-117.
Khimicheskaya Entsiklopediya. Pod red. N. S. Zefirov. Moskva, Nauchnoe Izdatelstvo "Bolshaya Rossyskaya Entsiklopediya", 1995, p. 133-137,529-530.
Kingston et al. "New Taxanes from *Taxus brevifolia*," *J of Natural Products*, 45 (1982) 466-470.
Lappas, A. A. et al. "Biomass pyrolysis in a circulating fluid bed reactor for the production of fuels and chemicals," *Fuel*, 81 (2002) 2087-2095.
Lappas, A.A. et al. "Production of Transportation Fuels from Biomass," *Workshop of Chemical Process Engineering Research Institute/Center for Research and Technology Hellas*, Thermi-Thessaloniki, Greece (2004).
Lappas, A.A., "Production of biofuels via co-processing in conventional refining process," *Catalysis Today*, 145 (2009) 55-62.
Maiti, R.N. et al. "Gas-liquid distributors for trickle-bed reactors: A review"; *Industrial and Engineering Chemistry Research*, 46:19 (2007) 6164-6182.
Mancosky, "The use of a controlled cavitation reactor for bio-diesel production," (abstract only), AIChE Spring National Meeting 2007, Houston, Texas.
Marker, Terry L., et al. "Opportunities for Biorenewables in Petroleum Refineries," Proceedings of the 230th ACS National Meeting, Washington, DC, Paper No. 125, Fuel Division (Aug. 31, 2005) (abstract only).
Marker, Terry L., et al., UOP, "Opportunities for Biorenewables in Oil Refineries," Final Technical Report, U.S. Department of Energy Award No. DE-FG36-05G015085, Report No. DOEGO15085Final (2005).
Marquevich, "Hydrogen from Biomass: Steam Reforming of Model Compounds of Fast-Pyrolysis Oil," *Energy & Fuels*, 13 (1999) 1160-1166.
Masoumifard, N. et al. "Investigation of heat transfer between a horizontal tube and gas-solid ftuidized bed," *International Journal of Heat and Fluid Flow*, 29:5 (2008) 1504-1511.
McLaughlin et al. 19-Hydroxybaccatin III, 10-Deacetylcephalo-Mannine, and 10-Deacetyltaxol: New Anti-Tumor Taxanes from *Taxus wallichiana*, *J of Natural Products*, 44 (1981) 312-319.
McNeil "Semisynthetic Taxol Goes on Market Amid Ongoing Quest for New Versions," *J of the National Cancer Institute*, 87:15 (1995) 1106-1108.
Meier, D. et al. "State of the art of applied fast pyrolysis of lignocellulosic materials—a review," *Bioresource Technology*, 68:1 (1999) 71-77.
Meier, D. et al., "Pyrolysis and Hydroplysis of Biomass and Lignins—Activities at the Institute of Wood Chemistry in Hamburg, Germany," vol. 40, No. 2, Preprints of Papers Presented at the 209th ACS National Meeting, Anaheim, CA (Apr. 2-7, 1995).
Mercader, F. et al. "Pyrolysis oil upgrading by high pressure thermal treatment," *Fuel*, 89:10 (2010) 2829-2837.
Miller et al. "Antileukemic Alkaloids from *Taxus wallichiana* Zucc," *J Org Chem*, 46 (1981) 1469-1474.
Mohan, D. et al. "Pyrolysis of Wood/Biomass for Bio-oil: A Critical Review," *Energy Fuels*, 20:3 (2006) 848-849.
Newton "Taxol: A Case Study in Natural Products Chemistry," Lecture Notes, University of Southern Maine, http:/www.usm.maine.edu/ (2009) 1-6.

(56) References Cited

OTHER PUBLICATIONS

Nicolaou et al. "Total Synthesis of Taxol," *Nature*, 367 (1994) 630-634.

Nowakowski, D. et al. "Potassium catalysis in the pyrolysis behaviour of short rotation willow coppice," *Fuels*, 86 (2007) 2389-2402.

Ognisty, T. P. "The direct contact heat transfer performance of a spray nozzle, a notched through distributor, and two inch Pall rings," AIChE 1990 Spring National Meeting (Orlando Mar. 18-22, 1990) Preprint N. 37c 36P, Mar. 18, 1990.

Ohman "Bed Agglomeration Characteristics during Fluidized Bed Combustion of Biomass Fuels," *Energy & Fuels*, 14 (2000) 169-178.

Okumura, Y. et al. "Pyrolysis and gasification experiments of biomass under elevated pressure condition," Nihon Kikai Gakkai Ronbunshu, B Hen/Transactions of the Japan Society of Mechanical Engineers, Part B, vol. 73, No. 7, 2007, pp. 1434-1441.

Olazar, M. et al. "Pyrolysis of Sawdust in a Conical Spouted-Bed Reactor with a HZSM-5 Catalyst," *AIChE Journal*, 46:5 (2000) 1025-1033.

Onay "Influence of pyrolysis temperature and heating rate on the production of bio-oil and char from safflower seed by pyrolysis, using a well-swept fixed-bed reactor," *Fuel Processing Technology*, 88 (2007) 523-531.

Onay, "Production of Bio-Oil from Biomass: Slow Pyrolysis of Rapeseed (*Brassica napus* L.) in a Fixed-Bed Reactor," *Energy Sources*, 25 (2003) 879-892.

Ong et al. "Pressurized hot water extraction of bioactive or marker compounds in botanicals and medicinal plant materials," *J Chromatography A*, 1112 (2006) 92-102.

Ooi, Y. S. et al. "Catalytic Cracking of Used Palm Oil and Palm Oil Fatty Acids Mixture for the Production of Liquid Fuel: Kinetic Modeling." *J Am Chem Soc*, 18 (2004) 1555-1561.

Otterstedt, J. E. et al. "Catalytic Cracking of Heavy Oils," in Occelli, Mario L. (ed) Fluid Catalytic Cracking, Chapter 17, ACS, Washington, DC (1988) 266-278.

Padmaja, K.V. et al. "Upgrading of Candelilla biocrude to hydrocarbon fuels by fluid catalytic cracking," *Biomass and Bioenergy*, 33 (2009) 1664-1669.

Pavia et al., Intro to Org Labo Techniques (1988) 3d ed. Saunders College Publishing, Washington p. 62-66, 541-587.

PCT/US2012/055384 International Search Report, dated Mar. 28, 2013, and International Preliminary Report on Patentability, dated Mar. 25, 2014.

Pecora, A.A.B. et al., "Heat transfer coefficient in a shallow fluidized bed heat exchanger with a continuous flow of solid particles," *Journal of the Brazilian Society of Mechanical Sciences and Engineering*, 28:3 (2006) 253-258.

Pecora, A.A.B., "An analysis of process heat recovery in a gas-solid shallow fluidized bed," *Brazilian Journal of Chemical Engineering*, 23:4 (2006) 497-506.

Petrik, P.T. et al. "Heart exchange in condensation of R227 coolant on inclined tubes placed in a granular BED," *Journal of Engineering Physics and Thermophysics*, 77:4 (2004) 758-761.

Prasad Y. S. et al. "Catalytic conversion of canola oil to fuels and chemical feedstocks. Part II. Effect of co-feeding steam on the performance of HZSM-5 catalyst," *Can J Chem Eng*, 64 (1986) 285-292.

Prins, Wolter et al. "Progress in fast pyrolysis technology," *Topsoe Catalysis Forum 2010*, Munkerupgaard, Denmark (Aug. 19-20, 2010).

Radlein, D. et al. "Hydrocarbons from the Catalytic Pyrolysis of Biomass," *Energy & Fuels*, 5 (1991) 760-763.

Rao "Taxol and Related Taxanes. I. Taxanes of *Taxus brevifolia* Bark," *Pharm Res* 10:4 (1993) 521-524.

Rao et al. "A New Large-Scale Process for Taxol and Related Taxanes from *Taxus brevifolia*," *Pharm Res*, 12:7 (1995) 1003-1010.

Ravindranath, G., et al., "Heat transfer studies of bare tube bundles in gas-solid fluidized bed", 9th International Symposium on Fluid Control Measurement and Visualization 2007, FLUCOME 2007, vol. 3, 2007, pp. 1361-1369.

Rodriguez, O.M.H. et al. "Heat recovery from hot solid particles in a shallow fluidized bed," *Applied Thermal Engineering*, 22:2 (2002) 145-160.

Samolada, M. C. et al. "Production of a bio-gasoline by upgrading biomass flash pyrolysis liquids via hydrogen processing and catalytic cracking," *Fuel*, 77:14 (1998) 1667-1674.

Sang "Biofuel Production from Catalytic Cracking of Palm Oil," *Energy Sources*, 25 (2003) 859-869.

Scahill, J. et al. "Removal of Residual Char Fines from Pyrolysis Vapors by Hot Gas Filtration," in Bridgwater, A. V. et al. (eds) *Developments in Thermochemical Biomass Conversion*, Springer Science+Business Media, Dordrecht (1997) 253-266.

Scott, D. et al. *Pretreatment of poplar wood for fast pyrolysis: rate of cation removal, Journal of Analytical and Applied Pyrolysis*, 57 (2000) 169-176.

Senilh et al. "Mise en Evidence de Nouveaux Analogues du Taxol Extraits de *Taxus baccata*," *J of Natural Products*, 47 (1984) 131-137. (English Abstract included).

Sharma, R. "Upgrading of pyrolytic lignin fraction of fast pyrolysis oil to hydrocarbon fuels over HZSM-5 in a dual reactor system," *Fuel Processing Technology*, 35 (1993) 201-218.

Sharma, R. K. et al. "Catalytic Upgrading of Pyrolysis Oil," *Energy & Fuels*, 7 (1993) 306-314.

Sharma, R. K. et al. "Upgrading of wood-derived bio-oil over HZSM-5," *Bioresource Technology*, 35:1 (1991) 57-66.

Smith R.M. "Extractions with superheated water," *J Chromatography A*, 975 (2002) 31-46.

Snader "Detection and Isolation," in Suffness, M. (ed) *Taxol—Science and Applications*, CRC Press, Boca Raton, Florida (1995) 277-286.

Srinivas, S.T. et al "Thermal and Catalytic Upgrading of a Biomass-Derived Oil in a Dual Reaction System," *Can. J. Chem. Eng.*, 78 (2009) 343-354.

Stierle et al. "The Search for Taxol-Producing Microorganism Among the Endophytic Fungi of the Pacific Yew, *Taxus brevifolia*," *J of Natural Products*, 58 (1995) 1315-1324.

Stojanovic, B. et al. "Experimental investigation of thermal conductivity coefficient and heat exchange between fluidized bed and inclined exchange surface," *Brazilian Journal of Chemical Engineering*, 26:2 (2009) 343-352.

Sukhbaatar, B. "Separation of Organic Acids and Lignin Fraction From Bio-Oil and Use of Lignin Fraction in Phenol-Formaldehyde Wood Adhesive Resin," *Master's Thesis*, Mississippi State (2008).

Twaiq, A. A. et al. "Performance of composite catalysts in palm oil cracking for the production of liquid fuels and chemicals," *Fuel Processing Technology*, 85 (2004) 1283-1300.

Twaiq, F. A. et al. "Liquid hydrocarbon fuels from palm oil by catalytic cracking over aluminosilicate mesoporous catalysts with various Si/Al ratios," *Microporous and Mesoporous Materials*, 64 (2003) 95-107.

Tyson, K. et al. "Biomass Oil Analysis: Research Needs and Recommendations," National Renewable Energy Laboratory, Report No. NREL/TP-510-34796 (Jun. 2004).

Valle, B. et al. "Integration of Thermal Treatment and Catalytic Transformation for Upgrading Biomass Pyrolysis Oil," *International Journal of Chemical Reactor Engineering*, 5:1 (2007).

Vasanova, L.K. "Characteristic features of heat transfer of tube bundles in a cross water-air flow and a three-phase fluidized bed," *Heat Transfer Research*, 34:5-6 (2003) 414-420.

Vitolo, S. et al. "Catalytic upgrading of pyrolytic oils over HZSM-5 zeolite: behaviour of the catalyst when used in repeated upgrading-regenerating cycles," *Fuel*, 80 (2001) 17-26.

Vitolo, S. et al. "Catalytic upgrading of pyrolytic oils to fuel over different zeolites," *Fuel*, 78:10 (1999) 1147-1159.

Wang, Xianhua et al., "The Influence of Microwave Drying on Biomass Pyrolysis," *Energy & Fuels* 22 (2008) 67-74.

Westerhof, Roel J. M. et al., "Controlling the Water Content of Biomass Fast Pyrolysis Oil," *Ind. Eng. Chem. Res.* 46 (2007) 9238-9247.

(56) References Cited

OTHER PUBLICATIONS

Williams, Paul T. et al. "Characterisation of oils from the fluidised bed pyrolysis of biomass with zeolite catalyst upgrading," *Biomass and Bioenergy*, 7:1-6 (1994) 223-236.
Williams, Paul T. et al. "Comparison of products from the pyrolysis and catalytic pyrolysis of rice husks," *Energy*, 25:6 (2000) 493-513.
Williams, Paul T. et al. "The influence of catalyst type on the composition of upgraded biomass pyrolysis oils," *J Analytical and Applied Pyrolysis*, 31 (1995) 39-61.
Yukimune et al. "Methyl Jasmonate-induced Overproduction of Paclitaxel and Baccatin III in Taxus Cell Suspension Cultures," *Nature Biotechnology* 14 (1996) 1129-1132.
Zhang et al. "Investigation on initial stage of rapid pyrolysis at high pressure using Taiheiyo coal in dense phase," *Fuel*, 81:9 (2002) 1189-1197.
Zhang, "Hydrodynamics of a Novel Biomass Autothermal Fast Pyrolysis Reactor: Flow Pattern and Pressure Drop," *Chern. Eng. Technol.*, 32:1 (2009) 27-37.
Graham, R.G. et al. "Thermal and Catalytic Fast Pyrolysis of Lignin by Rapid Thermal Processing (RPT)," Seventh Canadian Bioenergy R&D Seminar, Skyline Hotel, Ottawa, Ontario, Canada, Apr. 24-26, 1989.
Wisner, R. "Renewable Identification Numbers (RINs) and Government Biofuels Blending Mandates," *AgMRC Renewable Energy Newsletter* (Apr. 2009), available at http://www.agmrc.org/renewable_energy/biofuelsbiorefining_general/renewable-identification-numbers-rins-and-government-biofuels-blending-mandates/.
Qi et al. "Review of biomass pyrolysis oil properties and upgrading research," *Energy Conversion & Management*, 48 (2007) 87-92.
Office Action, U.S. Appl. No. 14/346,517, dated Sep. 25, 2015.
Yoo et al. "Thermo-mechanical extrusion pretreatment for conversion of soybean hulls to fermentable sugars," *Bioresource Technology*, 102 (2011) 7583-7590.
Fogassy, G. et al., "Biomass derived feedstock co-processing with vacuum gas oil for second-generation fuel production in FCC units," *Applied Catalysis B: Environmental*, 96:3-4 (2010) 476-485.
Gutierrez et al., "Co-Processing of Upgraded Bio-Liquids in Standard Refinery Units—Fundamentals," 15th European Biomass Conference & Exhibition, Berlin, May 7-11, 2007.
Mercader, "Pyrolysis Oil Upgrading for Co-Processing in Standard Refinery Units," Ph.D. Thesis, University of Twente (2010).
Samolada, M.C. et al., "Catalyst Evaluation for Catalytic Biomass Pyrolysis," *Energy & Fuels*, 14:6 (2000) 1161-1167.
Search Report dated Nov. 2017 (English translation) in Argentine Patent Application No. P110101700.

PROCESSES FOR CONTROLLING AFTERBURN IN A REHEATER AND FOR CONTROLLING LOSS OF ENTRAINED SOLID PARTICLES IN COMBUSTION PRODUCT FLUE GAS

CROSS REFERENCE TO RELATED APPLICATIONS

This application is a continuation of U.S. Application Ser. No. 12/784,256, filed May 20, 2010, which is incorporated herein by reference in its entirety.

FIELD OF THE INVENTION

The present invention generally relates to processes for controlling combustion in a reheater of a pyrolysis system, and more particularly relates to a process for controlling afterburn in the reheater and controlling loss of entrained solid particles in combustion product flue gas during regeneration of a heat transfer medium.

DESCRIPTION OF RELATED ART

Pyrolysis is a thermal process during which solid carbonaceous biomass feedstock, i.e., "biomass", such as wood, agricultural wastes/residues, algae, forestry byproducts, cellulose and lignin, municipal waste, construction/demolition debris, or the like, is rapidly heated to pyrolysis temperatures of about 300° C. to about 900° C. in the absence of air using a pyrolysis reactor. Biomass may be pyrolyzed using various pyrolysis methods, including the Rapid Thermal Process and catalytic pyrolysis. Under these conditions, solid, liquid, and gaseous pyrolysis products are formed. The gaseous pyrolysis products ("pyrolysis gases") comprise a condensable portion (vapors) and a non-condensable portion. The solid pyrolysis products include combustible solid particles containing carbon referred to as "char".

As known in the art, heat for the endothermic pyrolysis reaction is produced in a reheater zone of a pyrolysis reactor or in a separate reheater (collectively referred to herein as a "reheater") by combusting the non-condensable pyrolysis gases and the combustible solid particles produced in the pyrolysis reaction. Heat is transferred from the reheater to the pyrolysis reactor by a "heat transfer medium." The heat transfer medium typically comprises inert solid particles such as sand. In catalytic pyrolysis, catalytic solid particles may be used, instead of or in addition to the inert solid particles, as the heat transfer medium. At the completion of pyrolysis, the combustible solid particles have been mixed with the inert solid particles, the catalytic solid particles if present, or both, forming spent heat transfer medium. Spent heat transfer medium has a reduced ability to transfer heat, and in the case of catalytic solid particles, also a reduced catalytic activity. To restore the heat transfer medium, the spent heat transfer medium is continuously transferred from the pyrolysis reactor to the reheater after separation from the pyrolysis gases. The spent heat transfer medium is regenerated in the reheater by combusting the combustible solid particles therein. The regenerated heat transfer medium is then recirculated to the pyrolysis reactor. During combustion, the carbon in the combustible solid particles is convened to carbon dioxide. Removal of the carbon converts the combusted solid particles to ash. The buildup of ash in the reheater reduces the operating efficiency of the reheater and reduces the volume available to combust "new" ash entering the reheater. Ash build-up in the reheater is thus undesirable, and therefore its prompt removal from the reheater is desirable.

The heat transfer medium is maintained as a fluidized dense bed in a lower portion of the reheater by the upward passage of an oxygen-containing regeneration gas stream through the fluidized dense bed at a velocity of about 0.762 meters/second to about 0.9144 meters/second (about 2.5 to about 3 feet per second). Combustion product flue gas is in a dilute phase in an upper portion of the reheater. During regeneration of the spent heat transfer medium in the reheater, a portion of the solid particles therein (combustible solid particles, inert solid particles and if present, catalytic solid particles) as well as ash become entrained in the combustion product flue gas. The short height of the dense bed in the reheater and the size and density properties of the solid particles contribute to entrainment. The solid particles, particularly the smaller and less dense combustible solid particles and the ash, may be "blown" from the dense bed into the dilute phase because of the high superficial gas velocity of the oxygen-containing regeneration gas up through the dense bed. Unfortunately, if the combustible solid particles are not separated from the combustion product flue gas and returned to the fluidized dense bed of the reheater for combustion thereof, the entrained combustible solid particles may cause "afterburning" of the combustible solid particles in the dilute phase of the reheater or in downstream lines and equipment, rather than in the dense bed.

In addition to afterburning of the combustible solid particles, afterburning of the carbon monoxide in the oxygen-containing regeneration gas to $CO_2$ in the dilute phase may occur. Reheaters typically are designed to operate so that substantially all of the carbon monoxide (CO) in the oxygen-containing regeneration gas combusts to form carbon dioxide ($CO_2$), thereby imparting the heat of reaction to the reheater. However, there may be incomplete combustion of the dilute phase flue gas CO to $CO_2$ or incomplete consumption of $O_2$ in the dilute phase. Either problem also gives rise to afterburning. Afterburning is exothermic, and either must be quenched by additional injection of the oxygen-containing regeneration gas, or the combustion product flue gas must absorb the heat of combustion, which undesirably decreases the amount of heat transferred to the dense bed.

In addition to the afterburning problem caused by entrainment of the combustible solid particles, a portion of the hot regenerated inert and catalytic solid particles may be lost if not separated from the combustion product flue gas and returned to the dense bed for recirculation as the heat transfer medium or as a catalyst (in the case of the catalytic solids). Conventional regeneration methods have relied upon a single stage of gas-solid separators downstream of and outside the reheater to separate the entrained solid particles from the combustion product flue gas. However, the capacity of such separators is often exceeded and such outside separators cannot remove ash from the reheater promptly after combusting the carbon in the combustible solid particles and cannot return the solid particles to the dense bed while the solid particles are still in the reheater. Further attempts to prevent loss of the inert solid particles, catalytic solid particles, or both have included reducing the superficial gas velocity of the oxygen-containing regeneration gas below an optimized superficial gas velocity and, in the case of the inert solids, increasing their particle size and density to resist entrainment in the combustion product flue gas. However, these changes have not entirely prevented loss of such solid particles in the combustion product flue gas. Such loss increases production costs and lowers throughput of regenerated heat transfer medium to the pyrolysis reactor.

Accordingly, it is desirable to provide processes for controlling afterburn in a reheater and loss of entrained solid particles in the combustion product flue gas during regeneration of the heat transfer medium. It is also desirable to remove ash from the reheater promptly upon its formation and optimize the superficial gas velocity and size and density properties of the solid particles for regeneration. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Processes are provided for controlling afterburn in a reheater and loss of entrained solid particles from reheater flue gas. In accordance with one exemplary embodiment, the process for controlling afterburn and loss of entrained solid particles comprises pyrolyzing carbonaceous biomass feedstock using a heat transfer medium forming pyrolysis products and a spent heat transfer medium comprising combustible solid particles. The spent heat transfer medium is introduced into a fluidizing dense bed. The combustible solid particles of the spent heat transfer medium are combusted forming combustion product flue gas in a dilute phase above the fluidizing dense bed. The combustion product flue gas comprises product flue gas and solid particles entrained therein. The solid particles are separated from the combustion product flue gas to form separated solid particles. At least a portion of the separated solid particles are returned to the fluidizing dense bed.

Processes are provided for controlling afterburn in a reheater and loss of entrained solid particles from reheater flue gas in accordance with yet another exemplary embodiment of the present invention. The process comprises introducing spent heat transfer medium comprising combustible solid particles mixed with inert solid particles, catalytic solid particles, or both, into an oxygen-containing regeneration gas upwardly passing through a fluidized dense bed of heat transfer medium in a reheater at a temperature between about 300° C. to about 900° C. Combustion product flue gas is produced having at least a portion of the combustible solid particles mixed with the inert solid particles, the catalytic solid particles, or both entrained therein. The combustion product flue gas is passed through a flue gas-solids separator disposed in the reheater to produce substantially solids-free flue gas and separated combustible solid particles mixed with separated inert solid particles, separated catalytic solid particles, or both. At least a portion of the separated combustible solid particles mixed with the separated inert solid particles, the separated catalytic solid particles, or both, are passed to the fluidized dense bed.

Processes are provided for controlling afterburn in a reheater and loss of entrained solid particles from reheater flue gas in accordance with yet another exemplary embodiment of the present invention. The process comprises discharging the combustion product flue gas with entrained solid particles from a fluidized dense bed of a reheater into a dilute vapor phase in an upper portion of the reheater. Centrifugally separated solids are recovered in the fluidized dense bed in a bottom portion of the reheater from a flue gas-solids separator disposed in the reheater. Substantially solids-free flue gas separated from the entrained solid particles is passed through a flue gas transfer line in open communication with an external cyclone separator. Residual entrained solid particles are further separated from the substantially solids-free flue gas before effecting recovery of product flue gas from the external cyclone separator.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments of the present invention are directed to processes for controlling afterburn and loss of entrained solid particles in combustion product flue gas during regeneration of a heat transfer medium in a reheater of a pyrolysis system. The "reheater" may be a reheater zone of a pyrolysis reactor or a reheater separate from the pyrolysis reactor. The reheater is equipped with an internal gas-solids separator, such as a cyclone separator, a vortex separator, or both, as hereinafter described. Controlling afterburn and loss of entrained solid particles increases the amount of heat transferred to the reheater dense bed for regeneration of the heat transfer medium and also preserves the inert solid particles, the catalytic solid particles, or both, for recycling to the pyrolysis reactor, thereby increasing throughput to the pyrolysis reactor.

Figure 1:
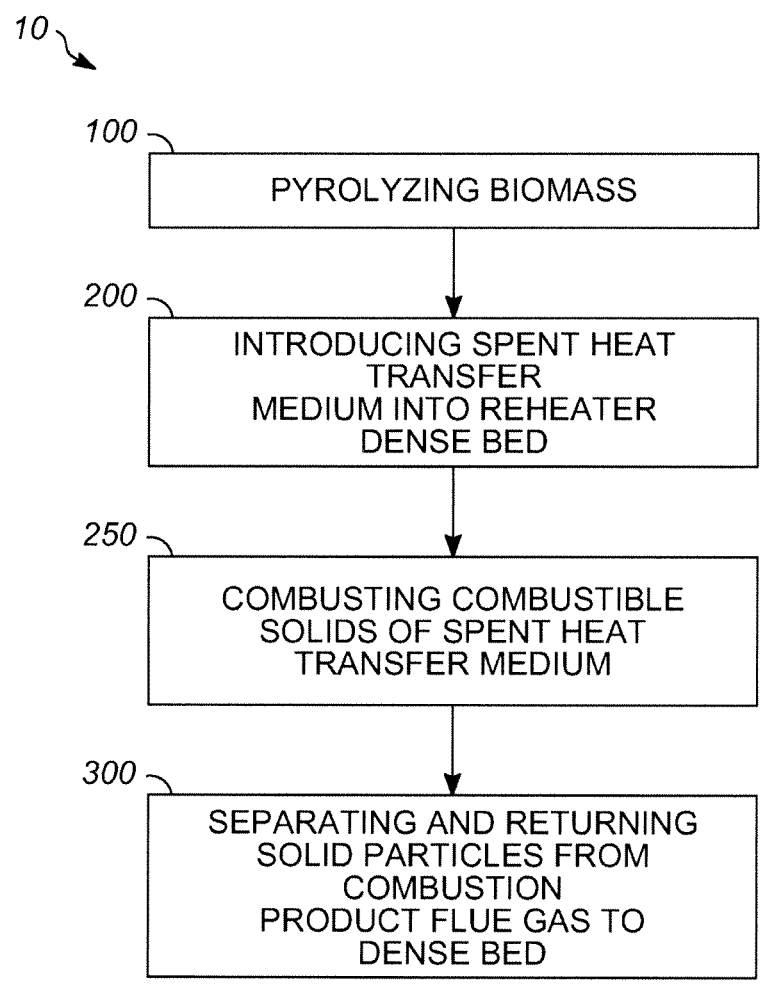
FIG. 1 is a flow chart of a process for controlling afterburn in a reheater and loss of entrained solid particles from the combustion product flue gas, according to exemplary embodiments of the present invention.
Figure 2:
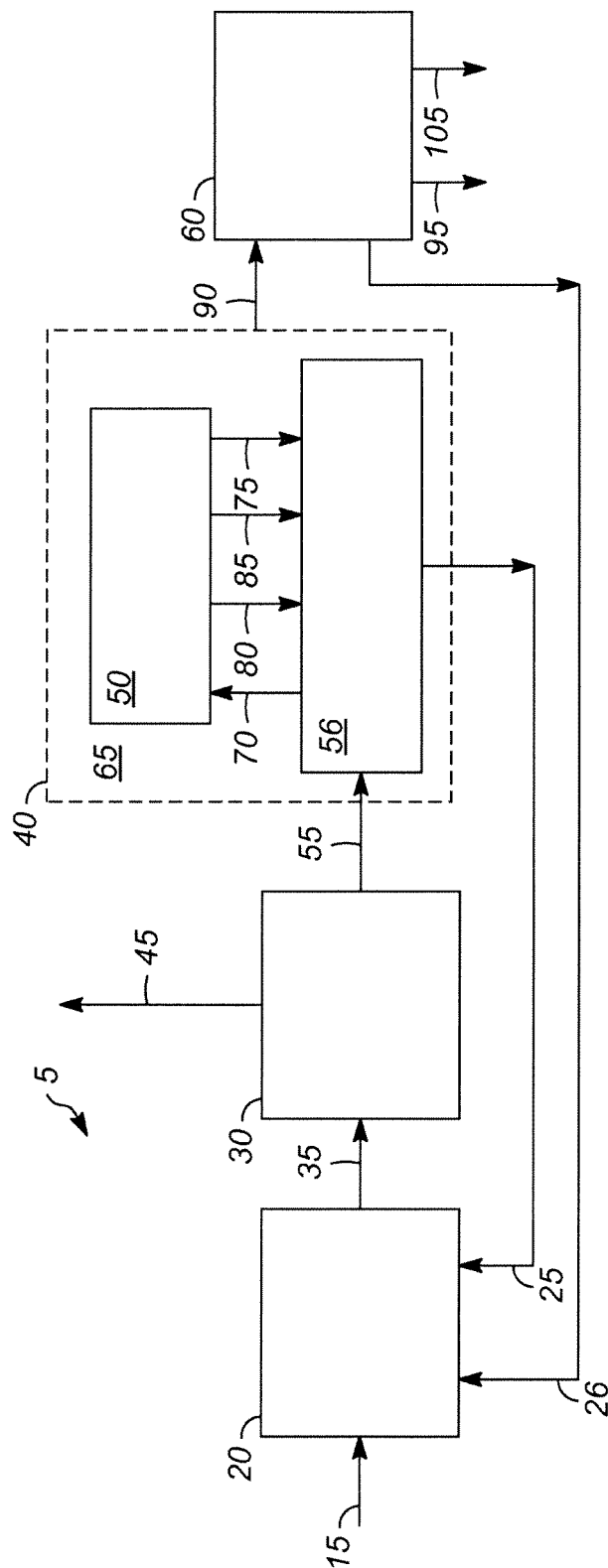
FIG. 2 is a schematic block diagram of an exemplary overall pyrolysis process flow, in accordance with exemplary embodiments of the present invention.

FIG. 1 is a process for controlling afterburn and loss of entrained solid particles from combustion product flue gas during regeneration of a spent heat transfer medium in accordance with an exemplary embodiment of the present invention. FIG. 2 is an exemplary embodiment of a pyrolysis system 5 that utilizes the process of FIG. 1. Referring to FIGS. 1 and 2, the process 10 begins by pyrolyzing carbonaceous biomass feedstock (hereinafter "biomass") 15 in a pyrolysis reactor 20 using a heat transfer medium and forming pyrolysis products and a spent heat transfer medium (step 100). As noted previously, the pyrolysis products comprise solid, liquid, and gaseous pyrolysis products. The gaseous pyrolysis products comprise a condensable portion (vapors) and a non-condensable portion. The condensable portion may be condensed into liquid biomass-derived pyrolysis oil. The solid pyrolysis products include combustible solid particles containing carbon (also referred to herein as "char"). The heat transfer medium comprises inert solid particles, such as sand, catalytic solid particles, or both. The heat transfer medium leaving the pyrolysis reactor is said to be "spent", because it contains combustible carbon-containing solids. The spent heat transfer medium leaving the pyrolysis reactor is entrained in the gaseous pyrolysis products ("pyrolysis gases"). The pyrolysis gases with entrained spent heat transfer medium are referred to in FIG. 2 with the reference number 35. The pyrolysis gases with entrained spent heat transfer medium are transferred from the pyrolysis reactor to a pyrolysis gas-solid separator 30 for separation into pyrolysis gases 45 and spent heat transfer medium 55.

Next, in accordance with an exemplary embodiment, and as shown in FIGS. 1 and 2, the process continues by introducing the spent heat transfer medium 55 from the pyrolysis gas-solid separator 30 into a fluidized dense bed 56 in a reheater 40 (step 200). An exemplary reheater (shown in FIGS. 3 and 4) comprises a large vertical substantially cylindrical vessel 110 wherein the heat transfer medium is maintained as the fluidized dense bed 56 in the reheater by the upward passage therethrough of an oxygen-containing regeneration gas stream 115, preferably air, which also agitates the heat transfer medium within the fluidized dense bed. The oxygen-containing regeneration gas stream flows upward through the spent heat transfer medium at a superficial gas velocity above the minimum velocity required to fluidize the solid particles of the heat transfer medium. The superficial gas velocity ($V_{fs}$) of the oxygen-containing regeneration gas may be calculated using the following equation:

$$V_{fs} = [\text{volume flow of gas}]/[\text{cross sectional area of pipe(conduit)}]$$

wherein subscript "s" denotes superficial and subscript "f" refers to the fluid. The fraction of vessel cross-sectional area available for the flow of gas is usually assumed to be equal to the volume fraction occupied by the gas, that is, the voidage or void fraction ε. The superficial gas velocity should be optimized to avoid operating the fluidized dense bed in a "slugging flow regime", i.e., it is desirable to operate the reheater at a superficial gas velocity above the superficial gas velocity at which the entrainment rate of solid particles is high, in order to reduce the diameter of the vessel. As previously noted, however, an optimized superficial gas velocity may "blow" the solid particles of the heat transfer medium (along with combustible solid particles as hereinafter described) from the fluidized dense bed 56 in a lower portion of the reheater vessel into a dilute vapor phase 65 in an upper portion of the reheater vessel above the fluidized dense bed of heat transfer medium. The oxygen-containing regeneration gas is distributed in the reheater through a reheater distributor 120. The spent heat transfer medium 55 is introduced into the reheater through an inlet conduit 125 and passed (carried) as a suspension by the oxygen-containing regeneration gas through the fluidized dense bed 56 of heat transfer medium in the reheater.

Referring to FIGS. 1 and 2, at least a portion of the combustible solid particles of the spent heat transfer medium are combusted using the stream of oxygen-containing regeneration gas (step 250). Heat from the combustion is transferred to the heat transfer medium in the fluidized dense bed and combustion product flue gas 70 is produced. The oxygen provided by the oxygen-containing regeneration gas stream may comprise at least the stoichiometric amount of oxygen needed for substantially complete combustion of the combustible solid particles, or an excess thereof. Alternatively, there may be additional oxidant streams if less than the stoichiometric amount of oxygen is provided by the oxygen-containing regeneration gas stream. Combustion raises the temperature of the dense bed material (i.e., the heat transfer medium) to the operating conditions needed in the pyrolysis reactor 20, i.e., to about 300° C. to about 900° C. The reheater is typically maintained at a temperature range of about 400° C. to about 1000° C.

The combustion product flue gas 70 is discharged from the fluidized dense bed 56 into the dilute vapor phase 65 in the upper portion of the reheater. The combustion product flue gas contains gases arising from the combustion of the combustible solid particles such as carbon dioxide, carbon monoxide from the oxygen-containing regeneration gas stream, inert gases such as nitrogen from air, and unreacted oxygen. The combustion product flue gas also contains entrained solid particles including non-combusted combustible solid particles 75 and hot dense bed material comprising hot regenerated inert solid particles 80, hot regenerated catalytic solid particles 85, or a combination thereof. The combustion product flue gas also contains ash particles.

The process 10 continues by separating the solid particles from the combustion product flue gas and returning a portion thereof to the fluidized dense bed 56 (step 300). In one exemplary embodiment, a portion of the solid particles are separated from the combustion product flue gas forming substantially solids-free flue gas 90 using a flue gas-solids separator 50. In another exemplary embodiment, the flue gas-solids separator is disposed in the reheater, as illustrated in FIG. 2. The substantially solids-free flue gas may contain residual combustible solid particles and residual ash particles as these particles are generally smaller (on average) than the inert solid particles and the catalytic solid particles and therefore not as easily separated from the flue gas in the flue gas-solids separator 50. That the substantially solids-free flue gas may contain residual ash particles enables the ash particles to escape the reheater confines, thus substantially preventing ash build-up in the reheater.

A portion of the separated combustible solid particles 75 are returned to the fluidized dense bed for combustion, which minimizes combustion (i.e., "afterburning") of the combustible solid particles in the dilute vapor phase or downstream therefrom. The separated hot regenerated inert solid particles 80, separated hot regenerated catalytic solid particles 85, or both, are returned to the dense bed 56 where they are withdrawn and returned to the pyrolysis reactor through outlet conduit 130 (FIGS. 3 and 4) for further usage in pyrolyzing carbonaceous biomass feedstock, as illustrated by arrow 25 in FIGS. 2-4. Outlet conduit 130 includes a valve 135 used to control the solids flow. A slide valve, for example, may be used. The separated hot regenerated inert solid particles 80 may be returned to the pyrolysis reactor for further usage as the heat transfer medium. The separated hot regenerated catalytic solid particles 85 may be returned to the pyrolysis reactor for usage as the heat transfer medium, a pyrolysis catalyst, or both.

The flue gas-solids separator 50 allows greater contact between the heat transfer medium and the combustible solid particles, resulting in a higher percentage of the heat released from combustion to be transferred to the heat transfer medium while still in the reheater. The optimized superficial gas velocity may be maintained and smaller, more fluidizable heat transfer medium may advantageously be used without significant concern that the solid particles will "blow" into the dilute vapor phase and be irretrievably lost. Smaller heat transfer medium particles increase the surface area for heat transfer making the heat transfer medium more fluidizable.

Figure 3:
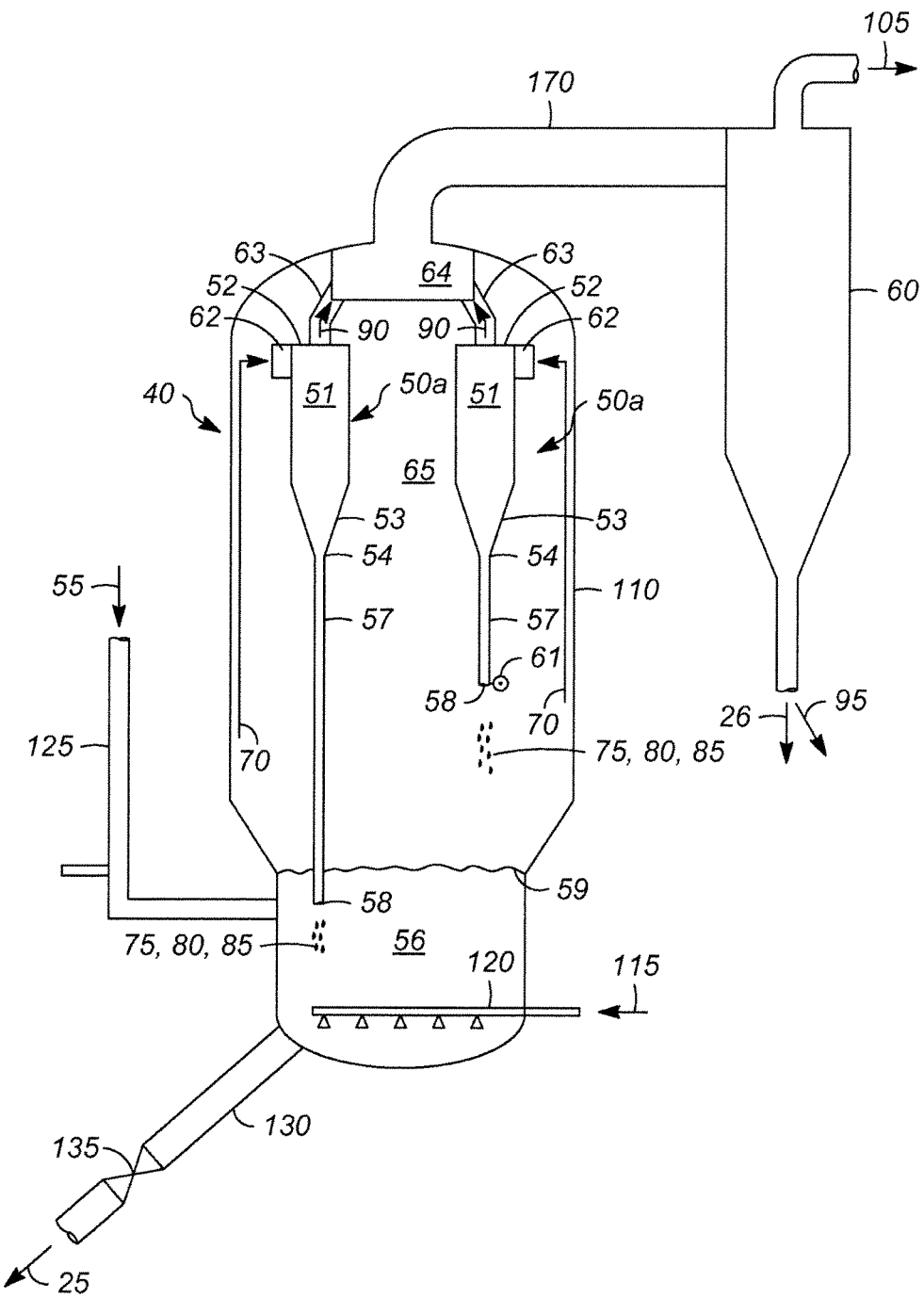
FIG. 3 is a cross-sectional view of a reheater having a cyclone separator disposed therein as used in the process of FIG. 1, according to exemplary embodiments of the present invention.

Referring to FIG. 3, in one embodiment, the flue gas-solids separator 50 comprises a cyclone separator 50a, which centrifugally separates the entrained solid particles from the combustion product flue gas. While FIG. 3 illustrates two cyclone separators in parallel, one cyclone separator may be used or more than two cyclone separators could be employed in the same parallel arrangement as illustrated, in a series flow arrangement, or in a different flow arrangement as the volume and loading of the combustion product flue gas vapor stream and the desired degree of separation dictate. An exemplary cyclone separator 50a, as illustrated, comprises an upper, generally cylindrical barrel portion 51 having a first wall 52, and a lower, generally conical portion 53 terminating in a solids outlet 54 with a diameter smaller than the barrel portion. The lower open end of the barrel portion 51 and the conical portion 53 at its wider diameter end are adjoined and/or are integral and together define a separation chamber. A generally cylindrical, solids discharge dipleg 57 has an upper end in open communication with the solids outlet 54 and a lower end 58 whereby separated solids can be removed from the cyclone separator. The lower end 58 of the solids discharge dipleg includes sealing means. The purpose of the sealing means is to substantially ensure that the solids discharge dipleg is sealed against the possibility of combustion product flue gas entering into its interior, which would cause a loss in separation efficiency. In a preferred embodiment, the sealing means comprises immersing the lower end of the solids discharge dipleg 57 in the fluidized dense bed of the reheater, i.e., below a top surface 59 of the fluidized dense bed.

In another embodiment, the sealing means comprises a sealing device 61 connected to the lower end of the solids discharge dipleg. Sealing devices may be of several types, such as flapper valves, trickle valves, or the like. An exemplary trickle valve is shown in FIG. 3. While FIG. 3 illustrates each of the cyclone separators having different scaling means, it is to be appreciated that the sealing means at the lower ends of the solids discharge diplegs may be the same for each cyclone separator. In operation, the combustion product flue gas 70 in the dilute vapor phase 65 enters a gas inlet 62 of each of the cyclone separators and is introduced tangentially into the barrel portion 51. The solid particles from the combustion product flue gas, because of their inertia, move toward the walls of the cyclone separator and spiral downwardly toward the separation chamber, being ultimately discharged through the solids discharge dipleg(s) 57 into or onto the dense bed in the reheater.

Referring to FIGS. 2 and 3, the substantially solids-free flue gas 90 from cyclone separator 50a passes upwardly through a gas outlet tube 63 and is discharged though an upper end into a plenum 64. It is then vented or otherwise removed from the reheater via flue gas line 170 and is passed to a conventional external cyclone separator 60 for removal of any residual entrained solid particles 95, such as combustible solids, sand, ash, or catalytic solids producing product flue gas 105. The sand and ash may be removed from the external cyclone separator for disposal. Catalytic solid particles may be recirculated to the reheater for reuse, as illustrated by arrow 26 in FIG. 2.

Figure 4:
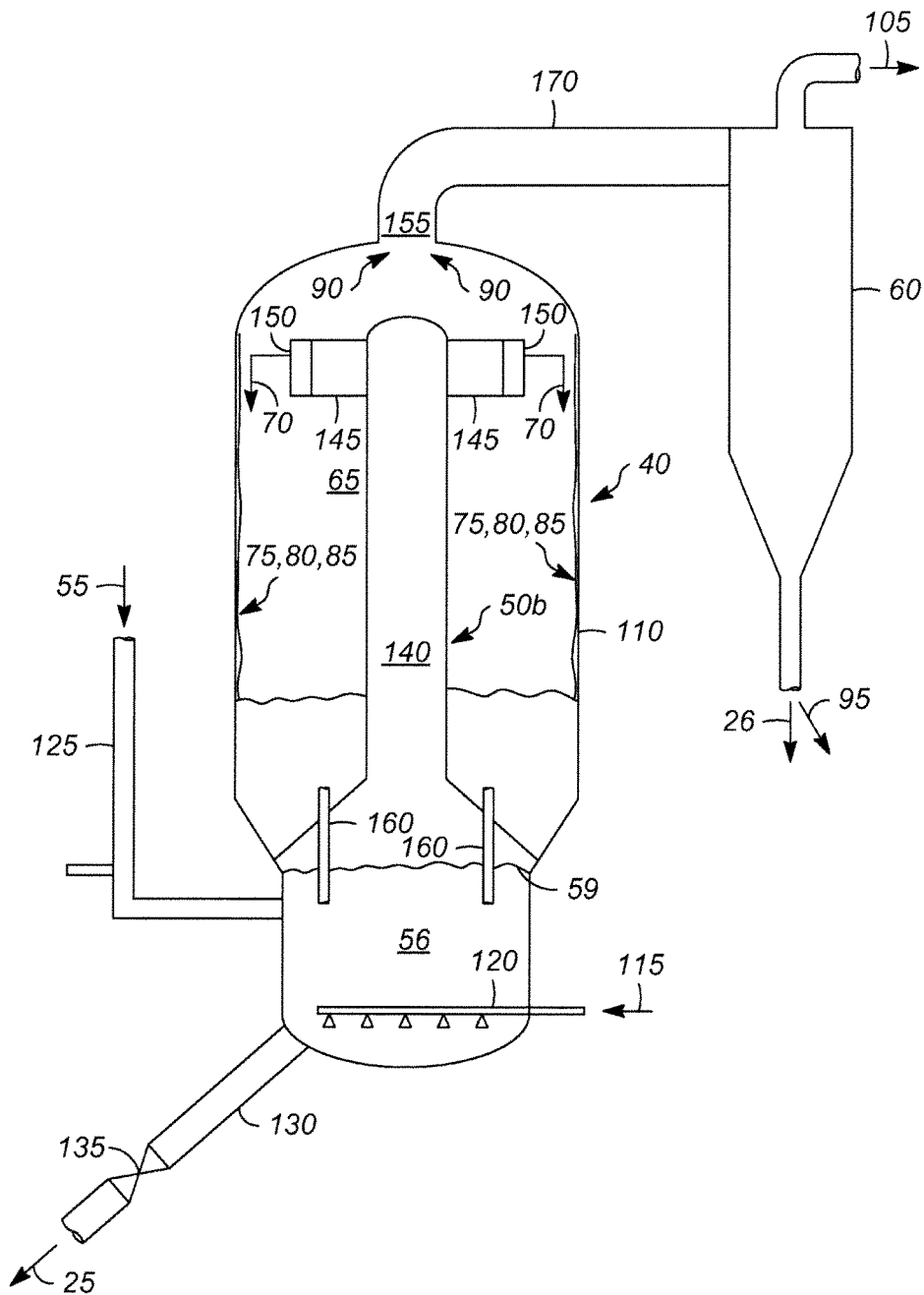
FIG. 4 is a cross-sectional view of a reheater having a vortex separator disposed therein as used in the process of FIG. 1, according to exemplary embodiments of the present invention.

In another embodiment, as shown in FIG. 4, the flue gas-solids separator 50 comprises a vortex separator 50b (also known as a swirl concentrator) disposed in the reheater. One or more vortex separators may be disposed in the reheater and one or more vortex separators may be used in combination with cyclone separators. Exemplary vortex separators for use in process 10 are described, for example, in U.S. Pat. Nos. 4,482,451 and 5,584,985 by the same named assignee, the contents of which are incorporated herein by reference in their entirety. Generally, the vortex separator 50b comprises a central conduit in the form of a riser 140 which extends upwardly from a lower portion of the reheater. The central conduit or riser 140 preferably has a vertical orientation within the reheater and may extend upwardly from the bottom of the reheater vessel 110. Riser 140 terminates in an upper portion of the reheater vessel 110 with a curved conduit in the form of an arm 145. The arm 145 discharges the combustion product flue gas 70 into the dilute vapor phase 65 of the reheater. The tangential discharge of the combustion product flue gas from a discharge opening 150 of the arm 145 produces a centrifugal (swirling helical) pattern about the interior of the vessel 110 below the discharge opening. Centripetal acceleration associated with the helical motion forces the separated hot regenerated solid particles 75, 80, 85 to the inside walls of the vessel 110. The separated hot regenerated solid particles collect in the bottom of the separation vessel. The separated hot regenerated solid particles exit the bottom of the separation vessel through discharge conduits 160 into the fluidized dense bed 56 in the reheater. The substantially solids-free flue gas 90 from the vortex separator 50b passes upwardly through a gas outlet 155 to the flue gas line 170 where it is vented or otherwise removed from the reheater and passed to the external cyclone separator 60 for removal of any residual entrained solid particles 95, such as combustible solids, sand, ash, and/or catalytic solids producing product flue gas 105. The sand and ash may be removed from the external cyclone separator 60 for disposal. Catalytic solid particles may be recirculated to the reheater for reuse, as illustrated by arrow 26 in FIG. 2.

From the foregoing, it is to be appreciated that the processes in accordance with the exemplary embodiments as described herein help control afterburn and loss of entrained solid particles from the combustion product flue gas. Separating the entrained combustible solid particles from the combustion product flue gas and returning them to the dense bed helps control afterburn in the dilute phase, thereby increasing the amount of heat transferred to the reheater dense bed for regeneration of the heat transfer medium. Separating the entrained inert solid particles, catalytic solid particles, or both of the heat transfer medium from the combustion product flue gas and returning the solid particles to the dense bed helps preserve such solid particles in the pyrolysis system. Production costs are therefore reduced and there is an increased throughput of regenerated heat transfer medium to the pyrolysis reactor. Similarly, passing the combustible solid particles to the flue gas-solids separator while still in the reheater and in contact with the inert solid particles, catalytic solid particles, or both, also increases the amount of heat transferred to the reheater dense bed. In addition, as the entrained solid particles are returned to the dense bed, efforts to resist entrainment such as reducing the superficial gas velocity below an optimized velocity and disadvantageously increasing the size and density of the solid particles of the heat transfer medium may no longer be necessary.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process, comprising:
   i) introducing char and heat transfer particles to a fluidized dense phase of a reheater;
   ii) passing air upwardly through the fluidized dense phase;
   iii) combusting a portion of the char to form upwardly flowing flue gas;
   iv) carrying a further portion of the char in the upwardly flowing flue gas to form entrained char; followed by
   v) recovering at least some of the entrained char, comprising:
      a) a first gas-solid separation in a dilute phase of the reheater, whereby a first portion of the entrained char is returned to the dense phase through a dipleg, the dipleg immersed below a top surface of the fluidized dense bed; and
      b) a second gas-solid separation, whereby a second portion of the entrained char is returned to the dense phase.

2. The process of claim 1, wherein the recovering is effective to reduce afterburn in the reheater and/or downstream lines of a rapid thermal processing system.

3. The process of claim 2, wherein the recovering is effective to reduce carbon monoxide afterburn in the reheater and/or downstream lines of a rapid thermal processing system.

4. The process of claim 1, wherein the recovering further comprises: reducing loss of heat transfer particles from the reheater.

5. The process of claim 1, wherein the velocity of the upwardly-passed air is optimized exclusive of any limitations imposed by an entrainment rate of char and/or heat transfer particles in the upwardly flowing flue gas.

6. The process of claim 1, wherein the velocity of the upwardly-passed air is optimized exclusive of any limitations imposed by a particle size of the heat transfer particles.

7. The process of claim 1, wherein the velocity of the upwardly-passed air is optimized exclusive of any limitations imposed by a heat transfer surface area of the heat transfer particles.

8. The process of claim 1, wherein the velocity of the upwardly-passed air is 2.5-3 feet per second.

9. The process of claim 1, wherein the upwardly-passed air initially contains in excess of the theoretical stoichiometric amount of oxygen for complete combustion of the char.

10. The process of claim 1, further comprising: combusting, in the fluidized dense phase, at least a portion of the recovered entrained char.

11. The process of claim 1, wherein the first gas-solid separation comprises vortex separation.

12. The process of claim 1, wherein the first gas-solid separation comprises cyclone separation.

13. The process of claim 1, wherein the second gas-solid separation is in the dilute phase of the reheater.

14. The process of claim 1, wherein the second gas-solid separation is exterior to the reheater.

15. The process of claim 1, wherein the first gas-solid separation and the second gas-solid separation occur in parallel.

16. The process of claim 1, wherein at least a portion of the heat transfer particles are combined with biomass in a rapid thermal processing reactor.

17. The process of claim 1, wherein the char and heat transfer particles are a product of rapid thermal processing of biomass.

18. The process of claim 1, wherein the heat transfer particles are not combustible.

19. The process of claim 1, wherein the heat transfer particles are inert solid particles.

20. The process of claim 1, wherein the heat transfer particles are catalyst particles.

* * * * *